(12) United States Patent
Hoshikawa

(10) Patent No.: US 8,582,020 B2
(45) Date of Patent: Nov. 12, 2013

(54) IMAGING APPARATUS WITH A CAMERA BODY WHEREON AN INTERCHANGEABLE LENS CAN BE REMOVABLY MOUNTED

(75) Inventor: Hideaki Hoshikawa, Koshigaya (JP)

(73) Assignee: Nikon Corporation, Tokyo (JP)

( * ) Notice: Subject to any disclaimer, the term of this patent is extended or adjusted under 35 U.S.C. 154(b) by 479 days.

(21) Appl. No.: 12/656,278

(22) Filed: Jan. 22, 2010

(65) Prior Publication Data

US 2010/0194974 A1 Aug. 5, 2010

(30) Foreign Application Priority Data

Jan. 23, 2009 (JP) .................................. 2009-013281
Jan. 15, 2010 (JP) .................................. 2010-007135

(51) Int. Cl.
*H04N 5/225* (2006.01)
*G03B 17/00* (2006.01)

(52) U.S. Cl.
USPC ............................ 348/360; 348/373; 396/529

(58) Field of Classification Search
USPC .......... 348/335, 360, 373, 374, 375; 396/354, 396/544, 529, 530, 531
See application file for complete search history.

(56) References Cited

U.S. PATENT DOCUMENTS

| | | | | |
|---|---|---|---|---|
| 6,126,334 A * | 10/2000 | Ohmori | ......................... | 348/374 |
| 7,492,408 B2 * | 2/2009 | Ito | .................................. | 348/335 |
| 7,657,174 B2 * | 2/2010 | Arai | ............................... | 348/360 |
| 7,753,603 B2 * | 7/2010 | Kawai | ........................... | 396/530 |
| 7,972,069 B2 * | 7/2011 | Shintani | ........................ | 396/452 |
| 2007/0035656 A1 | 2/2007 | Inaba | | |
| 2007/0047953 A1 * | 3/2007 | Kawai | ........................... | 396/544 |
| 2011/0080514 A1 | 4/2011 | Inaba | | |

FOREIGN PATENT DOCUMENTS

| | | | |
|---|---|---|---|
| JP | 10-146336 | | 6/1998 |
| JP | 2000241869 A | * | 9/2000 |
| JP | 2006-222546 | | 8/2006 |
| JP | 2007-47596 | | 2/2007 |
| JP | 2008-15017 | | 1/2008 |

OTHER PUBLICATIONS

Japanese Office Action issued Apr. 2, 2013 in corresponding Japanese Application No. 2010-007135.

* cited by examiner

*Primary Examiner* — Nhan T Tran

(57) ABSTRACT

Providing an imaging apparatus wherein dust does not easily adhere to the imaging portion. The apparatus comprising an imaging portion provided with an image pickup device, a first housing holding the imaging portion, a protective cover disposed a photographic object side, a second housing holding the cover and provided with a mount structure, to attachably and removably mount interchangeable lenses at the photographic object side, and wherein an airtight space is formed by at least one of the first and the second housings, the imaging portion, and the cover.

15 Claims, 14 Drawing Sheets

IMAGING APPARATUS WITH A CAMERA BODY WHEREON AN INTERCHANGEABLE LENS CAN BE REMOVABLY MOUNTED

The present application claims priority under 35 U.S.C. §119 to Japanese Patent Applications No. 2009-013281 filed on Jan. 23, 2009 and No. 2010-007135 filed on Jan. 15, 2010. The content of these applications is incorporated herein by reference in its entirety.

BACKGROUND OF THE INVENTION

1. Field of the Invention

The present invention relates to an imaging apparatus for imaging a photographic object image.

2. Description of the Related Art

Imaging apparatuses such as interchangeable lens digital cameras and the like generally have a structure wherein when attaching or removing a photographic lens, the inner space of the camera main body is exposed to the outside. As a result, the problem arises that dust entering the inner space of the camera main body from the outside adheres to the imaging portion.

Because of this, there is a device for preventing the adhesion to the imaging portion of dust entering from outside of the camera main body, by forming an airtight space in a housing including, as wall portions, a transparent cover disposed in the vicinity of the mount of the photographic object side, and a image pickup device of the photographer side (for example, refer to Japanese Unexamined Patent Publication 2000-241869).

SUMMARY OF THE INVENTION

However, in the above prior art the mirror which guides the photographic object light to the finder portion is disposed within the enclosed space, and because of this dust is generated within the airtight space, and there is the possibility that it will adhere to the imaging portion.

The object of the present invention is to provide an imaging apparatus wherein dust does not easily adhere to the imaging portion.

According to the present invention there is provided a an imaging apparatus comprising: an imaging portion provided with an image pickup device which images an image of a photographic subject, a first housing which holds the imaging portion, a protective cover which is disposed more towards a photographic object side than the first housing, a second housing which is a housing independent of the first housing, which holds the protective cover and which is provided with a mount structure more towards the photographic object side than the protective cover, to attachably and removably mount interchangeable lenses at the photographic object side, and wherein an airtight space is formed by at least one of the first housing and the second housing, the imaging portion, and the protective cover.

The imaging apparatus may further comprising at least one of a first tubular portion provided at the first housing and extending along an optical axis perpendicular to an image face of the image pickup device, or a second tubular portion provided at the second housing and extending along the optical axis.

In the case that the first housing has the first tubular portion, the image apparatus may further comprise a first sealing member between the first tubular portion and the protective cover or the second housing, and in the case that the second housing has the second tubular portion, the imaging apparatus may further comprise a second sealing member between the second tubular portion and the imaging portion or the first housing.

In the case that the first housing has the first tubular portion, and the second housing has the second tubular portion, the first tubular portion may be disposed on the inner side of the second tubular portion.

A third sealing member may be interposed between the imaging portion and the first housing.

The imaging portion may be position adjustable in a direction perpendicular to the image face of the image pickup device.

The imaging portion may be position adjustable in a direction parallel to the image face of the image pickup device, with respect to the second housing.

The second housing may be provided with a barrier member which can open and close a passing area of photographic object light incident on the imaging portion, at a position further towards the photographic object side than the protective cover.

The protective cover, in a state where the imaging apparatus may have been assembled, is attachable and removable with respect to the second housing.

The imaging apparatus may further comprising a retaining member disposed at the photographic object side of the protective cover, which has an attachable and removable structure with respect to the second housing, and which sandwiches and holds the protective cover between the retaining member and the second housing.

The attachable and removable structure may comprise an arm portion, provided at an outer peripheral portion of an image side of the retaining member, with one end joined to a joining portion of the retaining member, and extending parallel to the retaining member along a circumference from the joining portion, and an insertion opening, provided at the second housing, through which the arm portion is insertable, and is constituted such that in a state where the protective cover is disposed between the second housing and the retaining member, the arm portion is inserted into the insertion opening, and when the retaining member is rotated in a direction from the one end side of the arm portion towards the other end side, the other end side of the arm portion inserted into the insertion opening enters into an image side rear face of the second housing, and the retaining member is fixed to the second housing.

An engagement portion may be provided at an end portion of a photographic object side face of the arm portion, and an engagement receiving portion with which the engagement portion becomes engaged when the retaining member is rotated with respect to the second housing, is provided at an image side face of the second housing.

According to the present invention, there is provided an imaging apparatus wherein dust does not easily adhere to the imaging portion.

DETAILED DESCRIPTION OF THE PREFERRED EMBODIMENT

First Embodiment

Below, the first embodiment of the present invention is explained with reference to the drawings.

Figure 1:
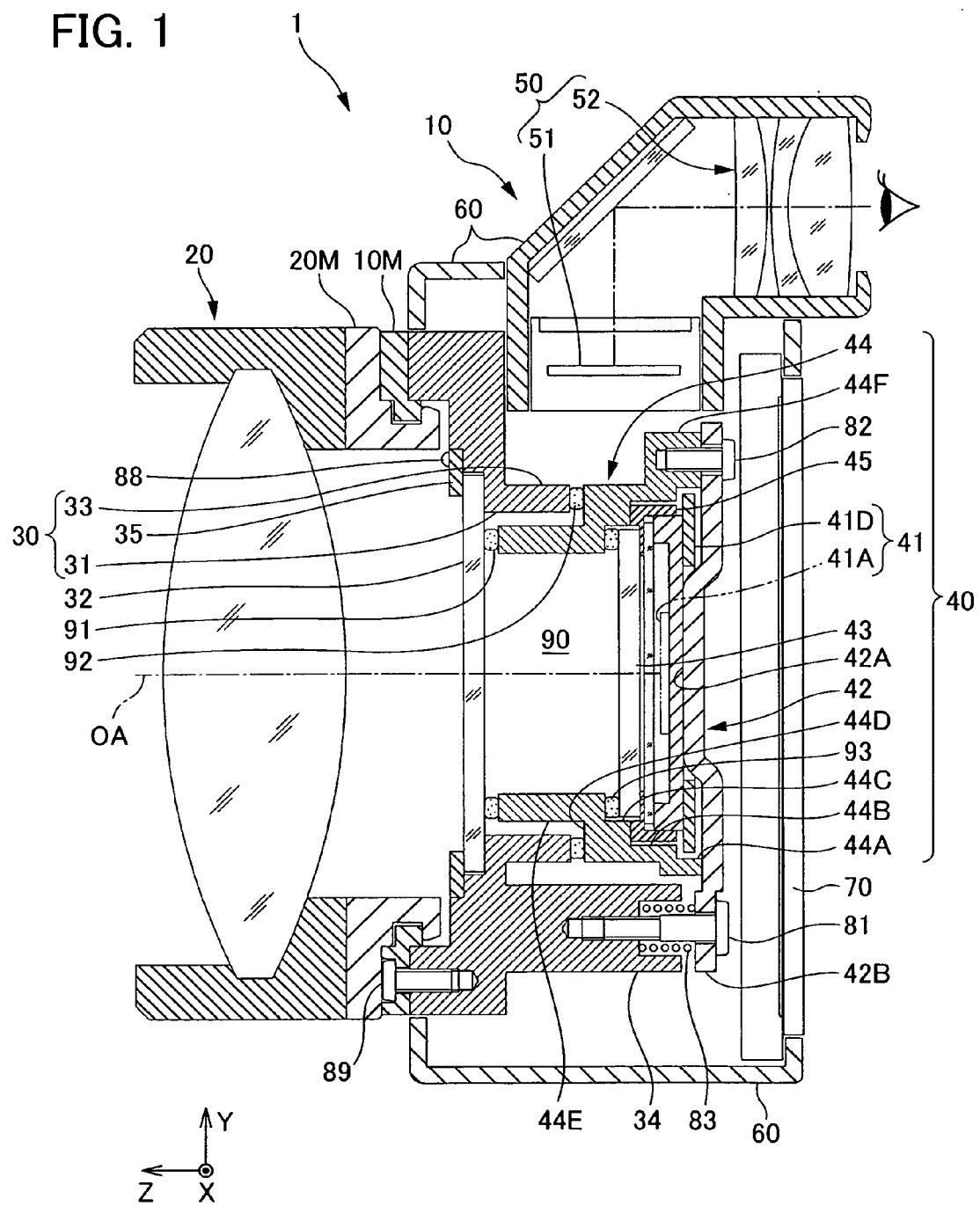
FIG. 1 is a cross sectional drawing showing an outline of the constitution of the camera of the first embodiment of the present invention.
Figure 2:
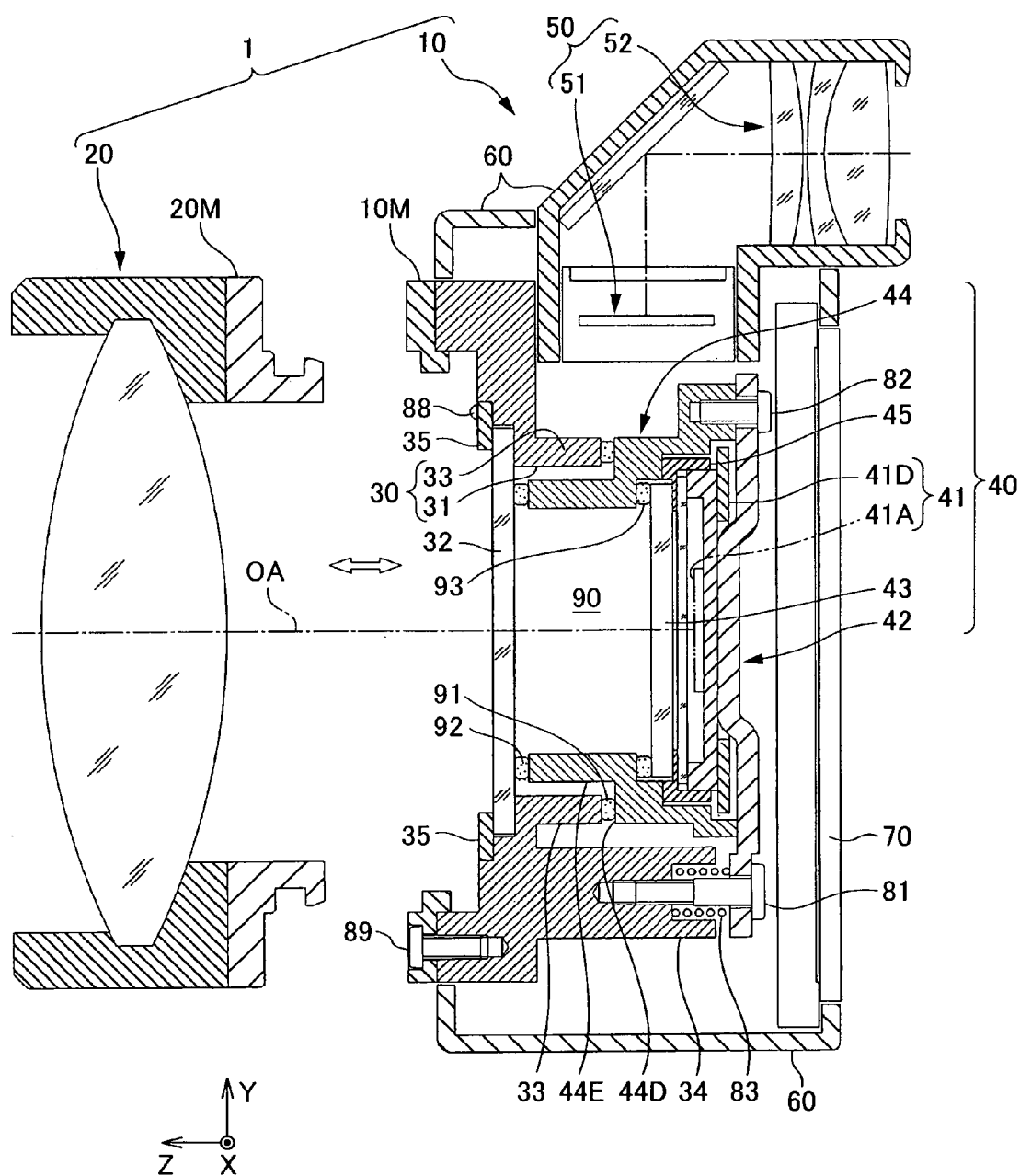
FIG. 2 is a cross sectional drawing showing the state where the photographic lens is removed from the camera main body in FIG. 1.

FIG. 1 is a cross sectional drawing showing an outline of the constitution of the camera 1 of the embodiment of the present invention. FIG. 2 is a cross sectional drawing showing the state wherein an interchangeable lens 20 freely attachable and removable from the camera 1, is removed form the camera main body 10.

Further, in the following drawings, in order to facilitate the explanations and understanding, a suitable XYZ Cartesian coordinate system was set. In this coordinate system, the direction facing towards the left side viewed by the photographer, in the position of the camera (below referred to as "normal position") in the case that the photographer is photographing a horizontal image with the optical axis OA horizontal, is the X plus direction. Further, in the normal position, the direction facing the upper side is the Y plus direction. Further, in the normal position, the direction facing the photographic subject is the Z plus direction. Further, in the following explanations, the Z plus direction facing the photographic subject is called the front face direction, and the opposite Z minus direction is called the rear face direction.

The camera 1 is a lens interchangeable type camera, and is constituted of the camera main body 10, and a interchangeable lens 20 attachable and removable with respect to the camera main body 10. The camera main body 10 is provided with the body mount 10M, while the interchangeable lens 20 is provided with the lens mount 20M. Then, by joining the body mount 10M and the lens mount 20M, the interchangeable lens 20 is mounted with respect to the camera main body 10 in a state wherein the optical axis OA thereof are coincident with each other. In this way, the interchangeable lens 20 is attachable and removable with respect to the camera main body 10, and various interchangeable lenses 20 with differing focal lengths and functions with in response to the photographic subject can be used.

The camera main body 10 is constituted of the camera structural body 30, the imaging unit 40 mounted onto the camera structural body 30, the electronic viewfinder 50, and the exterior member 60 and the like which houses these structural members. Further, the display device 70 (liquid crystal panel or the like) is provided at the rear side face (Z minus side) of the camera main body 10 of the exterior member 60.

The camera structural body 30 is a member disposed at the front face side (the side from which the photographic object light is incident) of the camera main body 10, and an opening portion 31 through which photographic object light passes is formed approximately in its center. The body mount 10M is fixed by mount screws 89 at the outer face of the front face side of the camera structural body 30.

The imaging unit 40 is a unit which is mounted to the rear face side of the camera structural body 30. The imaging unit 40 is mounted to the camera structural body 30 via the imaging substrate 42, such that the light receiving face of the image pickup device 41A is orthogonal to the optical axis OA, and the image portion 41 on which the image pickup device 41A, which is a CCD or the like which converts photographic object light into an electric signal, is held on the imaging substrate 42.

The photographic object image formed via the optical system of the interchangeable lens 20 on the image pickup device 41A of the imaging unit 40 is converted to an electric signal by the image pickup device 41A. The image data which is photoelectrically converted by the image pickup device 41A is signal-processed as image data by a control device, not shown, via an image mounting substrate 41D. The signal-processed image data is sent to the electronic viewfinder 50 and the display unit 70, and at the time of photographing, is recorded in a recording device, not shown.

Further, the camera 1 (camera main body 10) of the present embodiment is not provided with a mechanical shutter device. At the time of photographing, the adjustment of the exposure time of the photographic object light with respect to the image pickup device 41A (the time that the image pickup device 41A accumulates the photographic object light) is carried out by the electronic control (electronic shutter control) of the image pickup device 41A by the control portion.

The electronic viewfinder 50 is disposed at the upper portion of the camera main body 10, and is provided with an image radiation module 51 and an eyepiece optical system 52.

The electronic viewfinder 50 displays a through image imaged by the image pickup device 41A on the image radiation module 51. The photographer can view the image displayed on the image radiation module 51 via the eyepiece optical system 52. In this way, it is possible to see in real time an image by the image pickup device 41A in the same was as for a so-called single lens reflex camera, without providing a quick return mirror.

The display unit 70 displays the through image imaged by the image pickup device 41A on a liquid crystal panel. In this way, it is possible to see and photograph an image by the image pickup device 41A via the display unit 70, without looking at the electronic viewfinder 50.

A more detailed description is given later, but the imaging unit 40 and the camera structural body 30 constitute a dust-proof structure forming an airtight space 90 isolated from the outside. In this way, when an interchangeable lens 20 is changed, or the like, it is possible to prevent the problem of dust entering from the outside, adhering to the imaging unit 40 and showing in the image by the image pickup device 41A.

Next, the dustproof structure of this camera will be explained in detail with reference to FIG. 3 and FIG. 4, in addition to the previously mentioned FIG. 1 and FIG. 2.

Figure 3:
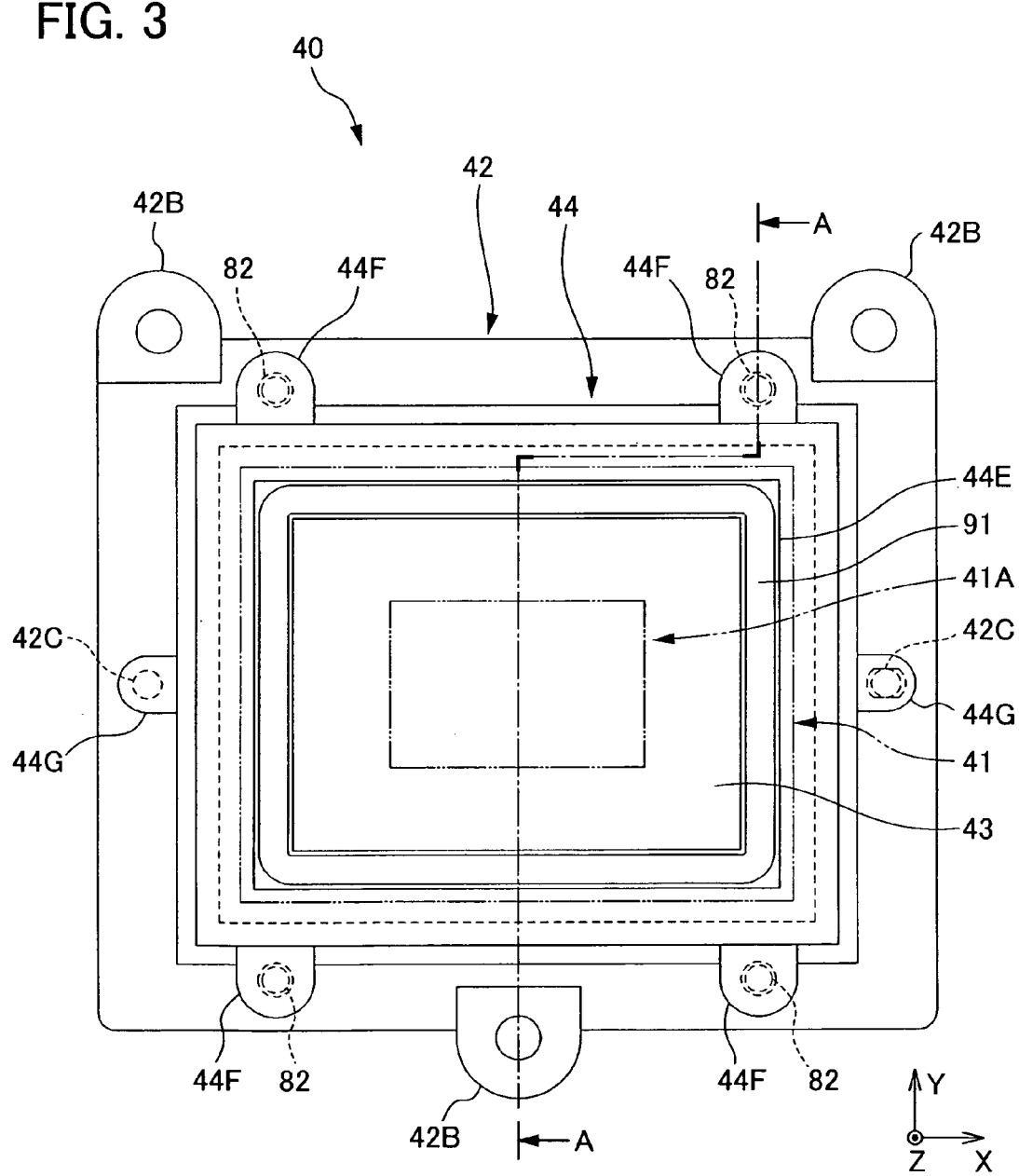
FIG. 3 is a drawing showing the imaging unit as seen from the front face side.

FIG. 3 is a drawing of the imaging unit 40 seen from the front face side. FIG. 4 is a cross sectional diagram of the A-A line of FIG. 3.

The camera structural body 30 as mentioned above, is provided with an opening portion 31 approximately in its center, through which photographic object light passes, and a cover glass 32 is mounted on the front face side opening portion of this opening portion 31. The opening portion 31 is set to have a size and form so as not to obstruct the transmission of the photographic object light arriving at the image pickup device 41A of the imaging unit 40. In the present embodiment, while not shown, it is a square form corresponding to the angle of view of the image pickup device 41A. Further, the form of the opening portion 31 is not limited to a rectangle, and for example may also be circular or the like.

The cover glass 32 mounted to the camera structural body 30 is formed as a plate of a predetermined thickness of a transparent material. Thus, it is accommodated in a recessed portion formed at the front face side of the opening portion 31. Then, in a state wherein the face of the rear face side of the cover glass 32 is closely contacted to the face of the front face side of the recessed portion of the opening portion 31 by the fixing member 35 at the front face of the camera structural body 30, it is fixed to the camera structural body 31 by a retaining screw 88. In this way, the cover glass 32 is sealed to the opening portion of the front face side of the opening portion 31, and the entry of dust to the inner portion of the opening portion 31 from the front face side of the camera main body 10 can be prevented. Further, the cover glass 32 is not limited to parallel plate glass, and it may also be a lens (a concave lens or a convex lens).

Further, the rear face side of the camera structural body 30 is provided with an outer casing portion 33. The outer casing portion 33 is a square tube (a round tube is also possible) provided at the periphery of the opening portion 31. At the rear face side of the camera structural body 30, at the outer side of the outer casing portion 33, the support portion 34 which supports the imaging unit 40 is set with a predetermined length facing the rear face side of the camera main body 10. This support portion 34 is provided at three locations on the camera structural body 30 so as to be positioned (correspond to) the sites 42B of the imaging unit 40 shown in FIG. 3 when the camera structural body 30 and the imaging unit 40 are joined.

The rear face side end of the support portion 34, in addition to having a fixing female screw formed thereon, also has formed thereon borings of a predetermined diameter and predetermined depth which are concentric with the fixing female screw.

At the rear face side of a camera structural body 30 constituted as above, the imaging unit 40 is mounted by adjustment mounting screws 81. The imaging unit 40 is constituted of an integrated assembly of an image pickup device 41A, an imaging substrate 42 which supports the image pickup device 41A, an optical low pass filter 43, and a light shielding structural body 44. Further, it is mounted on the camera structural body 30 as an integrated imaging unit 40.

Figure 4:
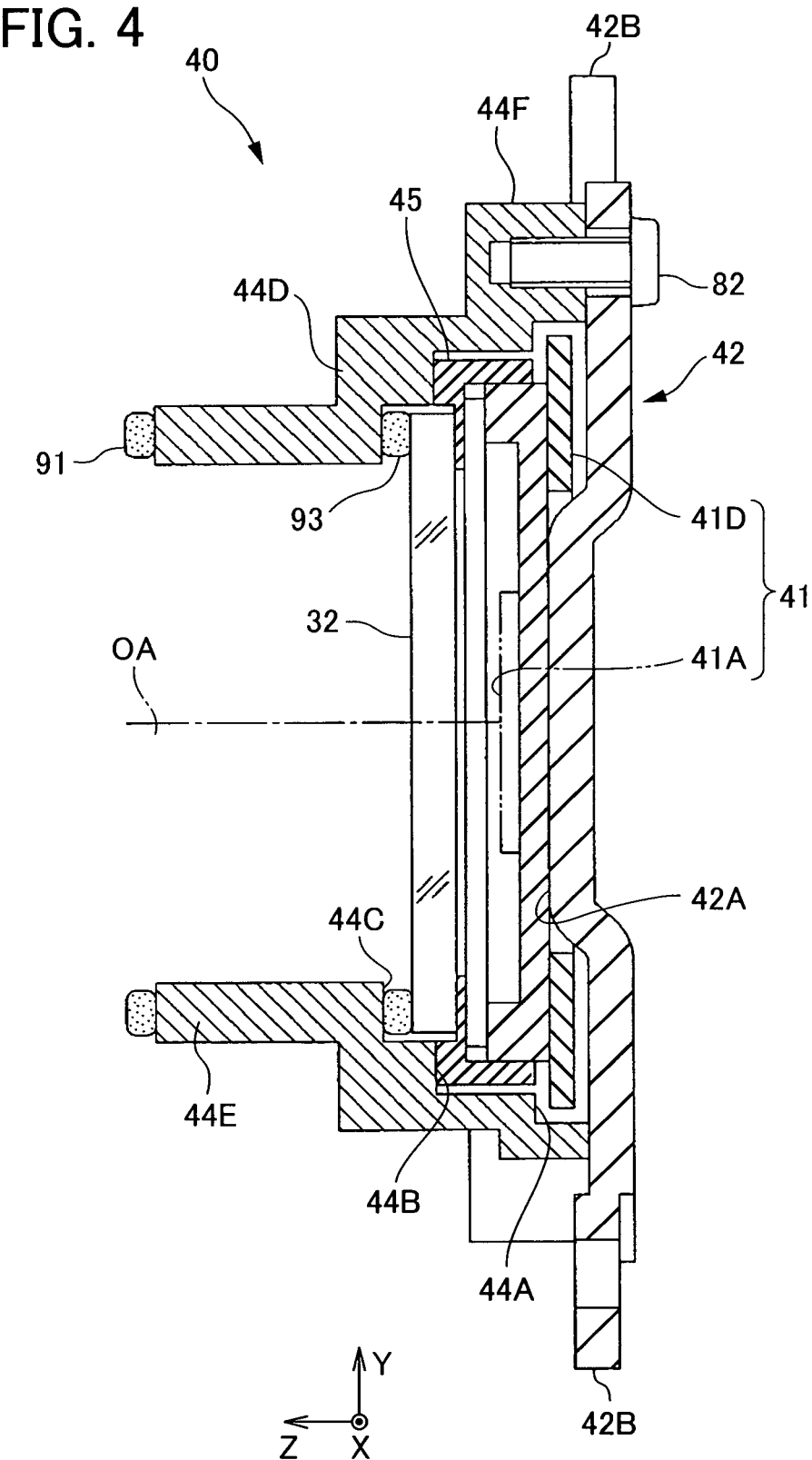
FIG. 4 is a cross sectional drawing along the A-A line of FIG. 3.

The imaging portion 41, as shown in FIG. 1 and FIG. 4, at the outer periphery of the rear face side of the imaging portion 41 on which the image pickup device 41A is disposed, is provided with an image mounting substrate 41D, and this image mounting substrate 41D is set to electrically connected the image pickup device 41A and the outside.

By fixing the light shielding structural body 44 with respect to the imaging substrate 42, the image pickup device 41A is simultaneously fixed to the imaging substrate 42. This fixing structure is described later.

The imaging substrate 42, as shown in FIG. 3, has a shape which when seen from the front face side, is a large rectangle with an approximately similar shape to the imaging portion 41. At the center portion of the imaging substrate 42, the support protrusion 42A which supports the imaging portion 41 (see FIG. 1 and FIG. 4) is formed to protrude with a predetermined height towards the front face side. On the surface of this support protrusion 42A, after carrying out the position adjustment (XY position adjustment) of the imaging portion 41, the rear face side of the imaging portion 41 is fixed onto the support protrusion 42A by an adhesive or the like.

Further, at the imaging substrate 42, the fixing portions 42B having respective through-holes are provided at positions corresponding to the support portions 34 of the camera structural body 30. Accordingly, there are a total of three fixing portions 42B, at two positions on the upper side, and one position at the lower side. The imaging substrate 42 is mounted to the camera structural body 30 by these fixing portions 42B.

Furthermore, at both the left and right sides of the imaging substrate 42, positioning raised portions (bosses) 42C which position the light shielding structural body 44 protrude with a predetermined height facing the respective front sides.

The optical low pass filter 43 is a plate shaped filter which suppresses the generation of Moire and the like in the photographic object image imaged at the light receiving face of the image pickup device 41A. The optical low pass filter 43 is disposed such that it sandwiches a mask 45 at the front face side of the imaging portion 41.

The optical low pass filter 43, in the same way as the previously described imaging portion 41, is fixed at the same time to the imaging substrate 42 by the fixing of the light shielding structural body 44 to the imaging substrate 42. This fixed structure will be described later.

The light shielding structural body 44, as shown in FIG. 3, has an outer form which when seen from the front face side, is a square tube similar in shape to the imaging portion 41 with a large periphery.

At the inner periphery of the light shielding structural body 44, as shown in FIG. 1 and FIG. 4, there are formed stepwise in a gradually tapering manner to the front face side, in order from the rear side face (the right side in the drawings), the mounting substrate accommodating step portion 44A which accommodates the image mounting substrate 41D, the imaging portion accommodating step portion 44B which accommodates the imaging portion 41, the filter accommodating step portion 44C which accommodates the optical low pass filter 43.

Further, the light shielding structural body 44 provides the inner casing portion 44E which is square tube extending a predetermined length by steps in the direction that the front face side becomes smaller, facing the front face side. At the outer periphery side of this inner casing portion 44E, the seal step face 44D having a predetermined width facing the front face side, is formed.

Furthermore, the outer periphery of the base end portion (the end portion of the rear face side) of the light shielding structural body 44 is provided with fixing protrusion portion 44F which provides respective female screws at the vicinity of both the left and right ends of the upper side (Y plus side) and bottom side (Y minus side). Accordingly, fixing protrusion portions 44F are respectively provided at the four corners of the light shielding structural body 44.

Furthermore, the light shielding structural body 44 is positioned at the above described positioning raised portion 42C by the positioning hole 44G.

The light shielding structural body 44 is fixed to the imaging substrate 42 by the fixing screws 82 being screw-joined to the female screw of the fixing raised portion 44F which passes through the imaging substrate 42.

In the state of the light shielding structural body 44 is fixed to the imaging substrate 42, the filter accommodating step portion 44C pushes the low pass filter 43 and the imaging portion 41 towards the imaging substrate 42, and fixes them to the imaging substrate 42. Accordingly, the imaging portion 41 and the optical low pass filter 43 are fixed by the light shielding structural body 44 in a so-called mutually fastened state to the imaging substrate 42. Further, if the mask 45 is constituted of a rubber material as described later, then the imaging portion 41 is pushed by this mask 45.

An imaging portion inner seal member 93 is interposed between the optical low pass filter 43 and the face perpendicular to the OA and optical axis OA of the filter accommodating step portion 44C. Further, the previously described mask 45 is interposed between the image pickup device 41A and the optical low pass filter 43.

The imaging portion inner seal member 93 is formed of a silicone rubber or closed cell sponge rubber or the like, having a predetermined elasticity. This imaging portion inner seal member 93 is sandwiched between and compressed by the filter accommodating step portion 44C and the optical low pass filter 43, and is closely contacted to both with a predetermined amount of elastic deformation, and forms an airtight seal between the two.

The mask 45 is interposed so as to form a clearance to such that the optical low pass filter 43 and the front face side of the imaging portion 41 do not contact each other. It may be formed of a synthetic resin material or the like, but if it is formed of a rubber material such as silicon rubber or the like having elasticity and which makes close contact, it can also function as a seal material preventing the entry of dust.

Further, the image mounting substrate 41D of the imaging portion 41 is accommodated at the front face side of the imaging substrate 42 one step below the periphery of the support protrusion 42A.

The imaging unit 40 constituted as described above can be mounted at the camera structural body 30 so as to allow position adjustment (flange back adjustment) in the optical axis OA direction via the fixing portion 42B of the imaging substrate 42. Accordingly, the adjustment mounting screws 81 which pass through the fixing portion 42B of the imaging unit 40, are passed through the coil spring 83 placed in the bore hole provided in the support portion 34 of the camera structural body 30 and are screw-joined to the fixing female screws, and as a result the imaging unit 40 is mounted to the camera structural body 30. The coil spring 83, by its elastic return force, push-energizes the imaging substrate 42 to the head portion lower face of the adjustment mounting screws 81. Accordingly, the position in the optical axis OA direction of the imaging unit 40 is prescribed by the position in the optical axis OA direction of the head portion lower face of the adjustment mounting screws 81. In this way, by forwards backwards adjustment in the optical axis OA direction by turning the adjustment mounting screws 81, the position in the optical axis OA direction of the imaging unit 40 with respect to the body mount face of the camera structural body 30 can be adjusted. Thus, after this position adjustment by the adjustment mounting screws 81, it is preferable to adhesively fix by an adhesive or the like the screws 81 in this adjusted position so as to prevent the screws 81 from moving by the effect of vibrations or the like applied to the camera.

Incidentally, at each fixing portion 42B of the imaging substrate 42, the diameter of the respective holes provided for engaging with the adjustment mounting screws 81 is formed to be slightly bigger than the diameter of the core portion of the adjustment mounting screws 81 (and smaller than the diameter of the screw head portion). This is in order to be able to adjust the positional relationship in the XY plane of the fixing portion 42B of the imaging substrate 42 with respect to the support portion 34. By this adjustment of the positional relationship, it is possible to adjust the positional relationship of the XY direction, it is possible to adjust the positional relationship in the XY plane (the direction parallel to the imaging face) of the imaging unit 40 with respect to the camera structural body 30. This XY position adjustment operation of the imaging unit 40 with respect to the camera structural body 30 is arranged to be performed before the adhesive fixing of the adjustment mounting screws 81.

Further, the structure for carrying out the position adjustment in the optical axis OA direction of the imaging unit 40 and fixing to the camera structural body 30 is not limited to the above constitution. For example, it may be constituted such that the fixing portion 42B of the imaging unit 40 is constituted to be closely contacted with the support portion 34 of the camera structural body 30 and fixed by a screw or the like, and by applying a cutting processing to the end face of the support portion 34, or to the face of the fixing portion 42B which closely contacts this end face, the position in the optical axis OA direction of the imaging unit 40 is adjusted with respect to the camera structural body 30.

In the state where the imaging unit 40 is mounted to the camera structural body 30, the inner casing portion 44E of the light shielding structural body 44 at the imaging unit 40 is engaged with the inner periphery side of the outer casing portion 33 of the camera structural body 30. There is a predetermined spacing between the end portion of the font face side of the inner casing portion 44E and the rear face of the cover glass 32 of the camera structural body 30, and between these, the first seal member 91 is interposed.

The end face of the rear face side of the outer casing portion 33 of the camera structural body 30 faces, with a predetermined spacing, the seal step face 44D of the light shielding structural body 44 of the imaging unit 40, and the second seal member 92 is interposed between these facing faces.

The first seal member 91 is formed of a silicone rubber or a closed cell sponge rubber having a predetermined elasticity. Then, it is sandwiched between and compressed by the cover glass 32 of the camera structural body 30 and the inner casing portion 44E of the light shielding structural body 44 of the imaging unit 40, and closely contacts both in a state of a predetermined amount of elastic deformation, and forms an airtight seal between the inside and outside of the space between the two.

The second seal member 92, in the same way as the first seal member 91, is formed of a silicone rubber or a closed cell sponge rubber having a predetermined elasticity. It is sandwiched between and compressed by the outer casing portion 33 of the camera structural body 30 and the seal step face 44D of the light shielding structural body 44 of the imaging unit 40, and closely contacts the two in a state of a predetermined amount of elastic deformation, and forms an airtight seal between the inside and outside of the two.

By the above joining structure of the camera structural body 30 and the imaging unit 40, the space between the cover glass 32 of the camera structural body 30 and the imaging unit 40 is isolated in an airtight manner from the outside, and the airtight space 90 which prevents the entry of dust from the outside is formed.

Accordingly, the entry of dust into the airtight space 90 from the front face side of the camera structural body 30 is prevented by the cover glass 32. The entry of dust from the rear face side of the imaging unit 40 which is mounted to the camera structural body 30 is prevented in particular by the seal member 93 of the imaging unit 40 and the mask 45.

Further, the entry of dust into the airtight space 90 from the surroundings of the joining site of the camera structural body 30 and the imaging unit 40 is hindered by the second seal member 92 interposed between the outer casing portion 33 of the camera structural body 30 and the light shielding structural body 44 (seal step face 44D) of the imaging unit 40, and by the first seal member 91 interposed between the cover glass 32 mounted to the camera structural body 30 and the inner casing portion 44E of the light shielding structural body 44 of the imaging unit 40. That is, the entry of dust into the airtight space 90 is prevented at the perimeter of the joining site of the camera structural body 30 and the imaging unit 40 by the double seal structure of the second seal member 92 and the first seal member 91. Further, the seal structure preventing the entry of dust from the periphery of the joining site of the camera structural body 30 and the imaging unit 40 does not necessarily have to be provided as a double seal, and may be only either one. However, if it is a double seal as in the present embodiment, it is possible to obtain a higher dust entry prevention effect.

According to the embodiment explained above, an airtight space 90 isolated from the outside is formed between the cover glass 32 of the camera structural body 30 and the imaging unit 40.

In this way, when changing an interchangeable lens 20 or the like, it is possible to prevent the problem of dust which has entered from the outside adhering to the imaging unit 40 (the front face side of the imaging portion 41 (optical path face side) and the optical low pass filter 43), and showing in the image by the image pickup device 41A. Further, when changing an interchangeable lens 20, it may occur that dust adheres to the outer side surface (front face) of the cover glass 32. However, the position for disposing the cover glass 32 is distanced from the image pickup device 41A, thus even if by chance dust does adhere to the front face of the cover glass 32, its effect on the image will be small. Further, the cover glass 32 is disposed at the front face side opening portion of the camera structural body 30, and because it is close to the mount face of the body mount 10M, it can be easily cleaned.

Furthermore, the camera 1 of the present embodiment is not provided with a quick return mirror or a shutter, and thus absolutely no moving mechanisms are disposed in the inner portion of the airtight space 90. Accordingly, in the inner portion of the airtight space 90, there is no occurrence of minute abrasion dust being generated by the movement of moving mechanisms and adhering to the imaging unit 40.

The above embodiment has the following effects.

(1) By forming an airtight space 90 which is isolated from the outside of the periphery at the imaging unit 40 by the camera structural body 30 and the imaging unit 40, it is possible to prevent the problem of dust entering form the outside when changing an interchangeable lens 20 or the like, and adhering to the imaging unit 40 and showing in the image by the image pickup device 41A.

(2) Because no moving mechanisms are disposed in the inner portion of the airtight space 90, there will be no fine abrasion dust or the like formed by the movement of moveable mechanisms adhering to the imaging unit 40.

(3) The camera structural body 30 on which the body mount 10M is provided and the imaging unit 40 on which the imaging portion 41 is provided are constituted as separate bodies, and by mounting the imaging unit 40 so as to have an adjustable position in the optical axis OA direction with respect to the body mount 10M of the camera structural body 30, it is possible to carry out processing and adjustment of the positional precision of the imaging portion 41 by the imaging unit 40, and in addition to making the assembly and adjustment operation easy, it is also easy to ensure precision.

(4) By separately constituting the camera structural body 30 on which the body mount 10M is provided and the imaging unit 40 on which the imaging portion 41 is provided, it is possible to easily carry out a cleaning operation of the inner portion when manufacturing.

(5) By constituting the airtight space 90 by mounting the imaging unit 40 as a separate piece to the camera structural body 30, even if by chance dust is discovered inside the airtight space 90, is it possible to easily disassemble and clean, and thus the maintenance operability is improved.

Second Embodiment

Figure 5:
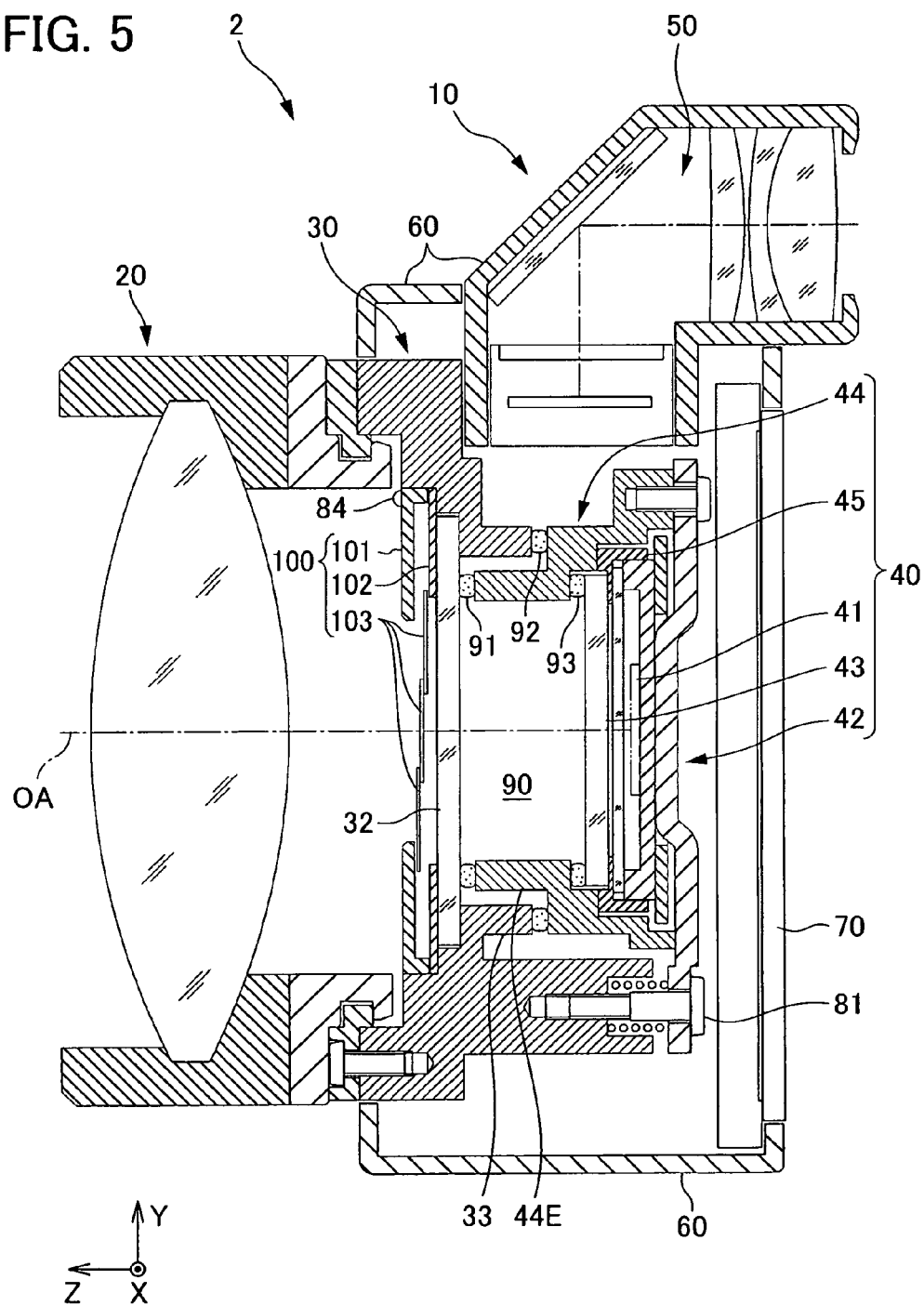
FIG. 5 is a cross sectional drawing showing an outline of the constitution of the camera of the second embodiment of the present invention.

Next, the second embodiment of the present invention is explained based on FIG. 5.

FIG. 5 is a cross sectional drawing showing an outline of the constitution of the camera 2 of the second embodiment. Further, the basic constitution of the camera 2 is the same as that of the camera 1 shown in the previously described FIG. 1 and FIG. 2, and parts having the same function are given the same reference numbers, and explanations thereof are omitted.

The camera 1 of the previously explained embodiment is not provided with a mechanical type shutter device.

Accordingly, if a shading means such as a cap which covers the front face of the interchangeable lens 20 or the like is not attached, the image pickup device 41A will constantly be exposed to the image light incident from the interchangeable lens 20. Depending on the type of the image pickup device 41A, this may be undesirable from the viewpoint of durability or the like.

The camera 2 of the second embodiment is provided with a barrier member 100, at the front face side of the cover glass 32 at the camera structural body 30 of the camera main body 10.

The barrier member 100 is constituted such that a barrier unit 103 which can open or close the light path is provided between a barrier base plate 101 and a cover plate 102. Moreover, the barrier unit 103 is driven to open and close by a driving means, not shown. Further, in the present embodiment, the barrier member 100 does not need to have high accuracy to govern the exposure time, and it may have any constitution so long as it can open and close, and shield the light path in a closed state.

The barrier member 100 is accommodated in a recessed portion formed at the front face side of the camera structural body 30, and is fixed to the camera structural body 30 by mounting screws 84 at its periphery.

Here, the cover glass 32 which is positioned adjoining the rear face side of the cover plate 102 of the barrier member 100 is fixed to the camera structural body 30 by pressure from the barrier member 100, due to the fixing to the camera structural body 30 of the barrier member 100. That is, in the present constitution, the barrier member 100 also simultaneously serves as a fixing member (the fixing member 35 in the previously described embodiment) which fixes the cover glass 32 to the camera structural body 30. In this way, there is no need for a specialized fixing member, and the number of parts and the number of assembly steps can be reduced, and the constitution becomes further rationalized.

The opening and closing of the barrier unit 103 in the barrier 100 is controlled by a control portion, not shown. Basically, in the state where the main switch is cut (electric power OFF state), the barrier unit 103 is closed, and in a photographing standby state where the main switch is engaged (electric power ON state), the barrier unit 103 is open. Further, even in the electric power ON state, in a state where an interchangeable lens 20 is not mounted on the camera main body 10 (a state where the interchangeable lens 20 has been removed from the camera main body 10), the barrier unit 103 can be made to close. In addition, in the case of a long exposure or the like, the barrier unit 103 can also be closed when acquiring background noise information used for background noise reduction processing.

According to the constitution of the second embodiment explained above, a barrier member 100 is further provided at the front face side of the cover glass 32 constituting the front face side of the airtight space 90, and by closing the barrier unit 103 in an electric power OFF state, it is possible to prevent the image pickup device 41A of the imaging portion 41 from being constantly exposed to object light incident from the interchangeable lens 20, protecting the image pickup device 41A.

Further, by closing the barrier unit 103 in the state that an interchangeable lens 20 is not mounted to the camera main body 10, it is possible to prevent the adhesion of dust to the surface of the cover glass 32 when changing the interchangeable lenses 20 or the like.

Further, by closing the barrier unit, it is possible to avoid the concern that foreign objects may directly contact the cover glass 32 and scratch the surface of the cover glass (for example, having the end face of an interchangeable lens hit and scratch the cover glass surface when changing lenses).

The above second embodiment, in addition to the effects of the first embodiment, has the following effects.
(1) The barrier member 100 is provided at the front face side of the cover glass 32 which is a constituent of the airtight space 90, and by closing the barrier unit 103 when in an electric power OFF state, it is possible to prevent the image pickup device 41A from being constantly exposed to object light incident from the interchangeable lens 20, and the sensor 41A can be protected.
(2) The barrier member 100 is provided at the front face side of the cover glass 32 which is a constituent of the airtight space 90, and by closing the barrier 103 in a state where an interchangeable lens 20 is not mounted on the camera main body 10, it is possible to prevent dust from adhering to the surface of the cover glass 32 when changing interchangeable lenses and the like, and to prevent scratching by contact.

Third Embodiment

Below, the third embodiment of the present invention is explained with reference to the drawings.

Figure 6:
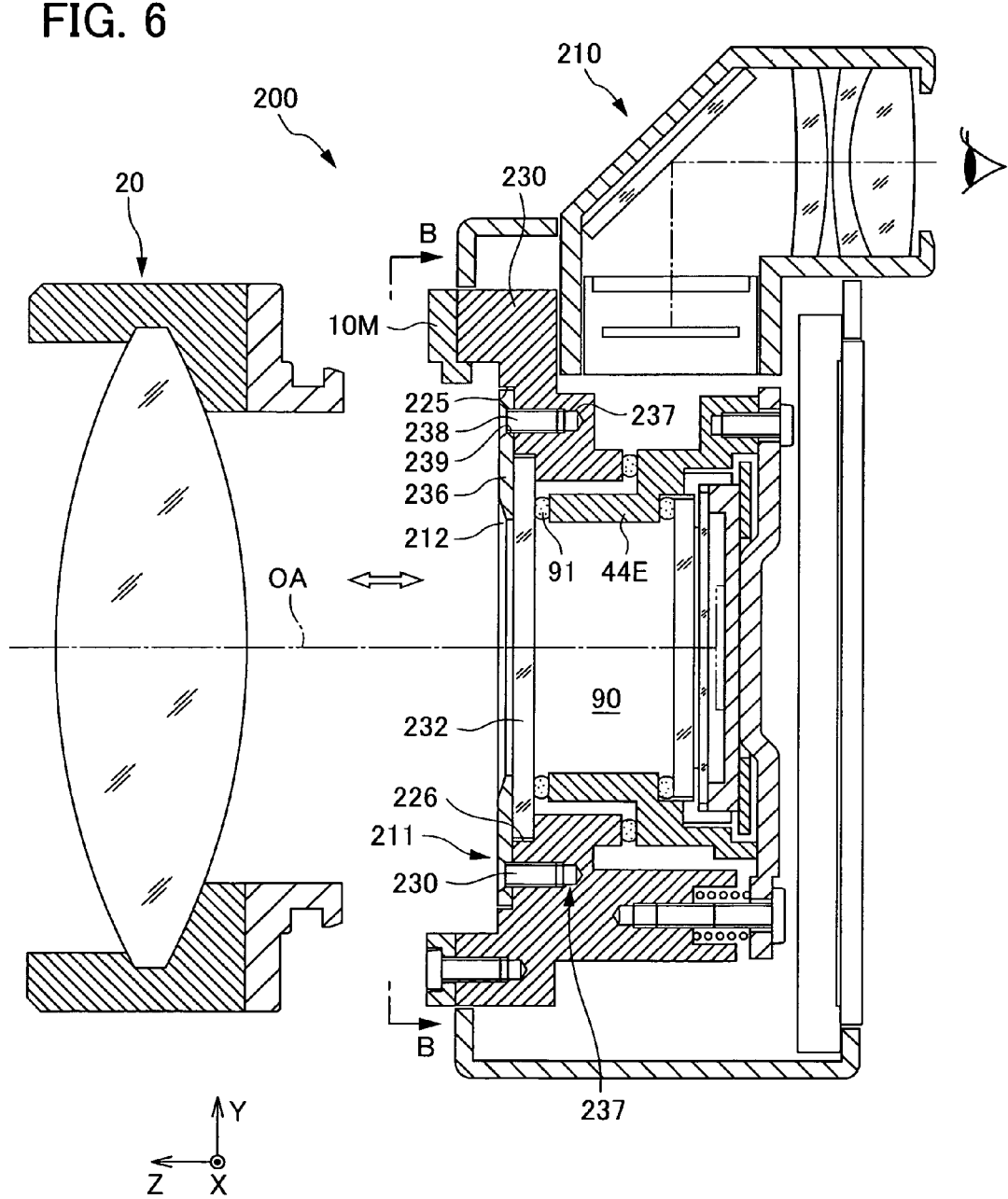
FIG. 6 is a cross sectional drawing showing an outline of the constitution of the camera of the third embodiment of the present invention.
Figure 7:
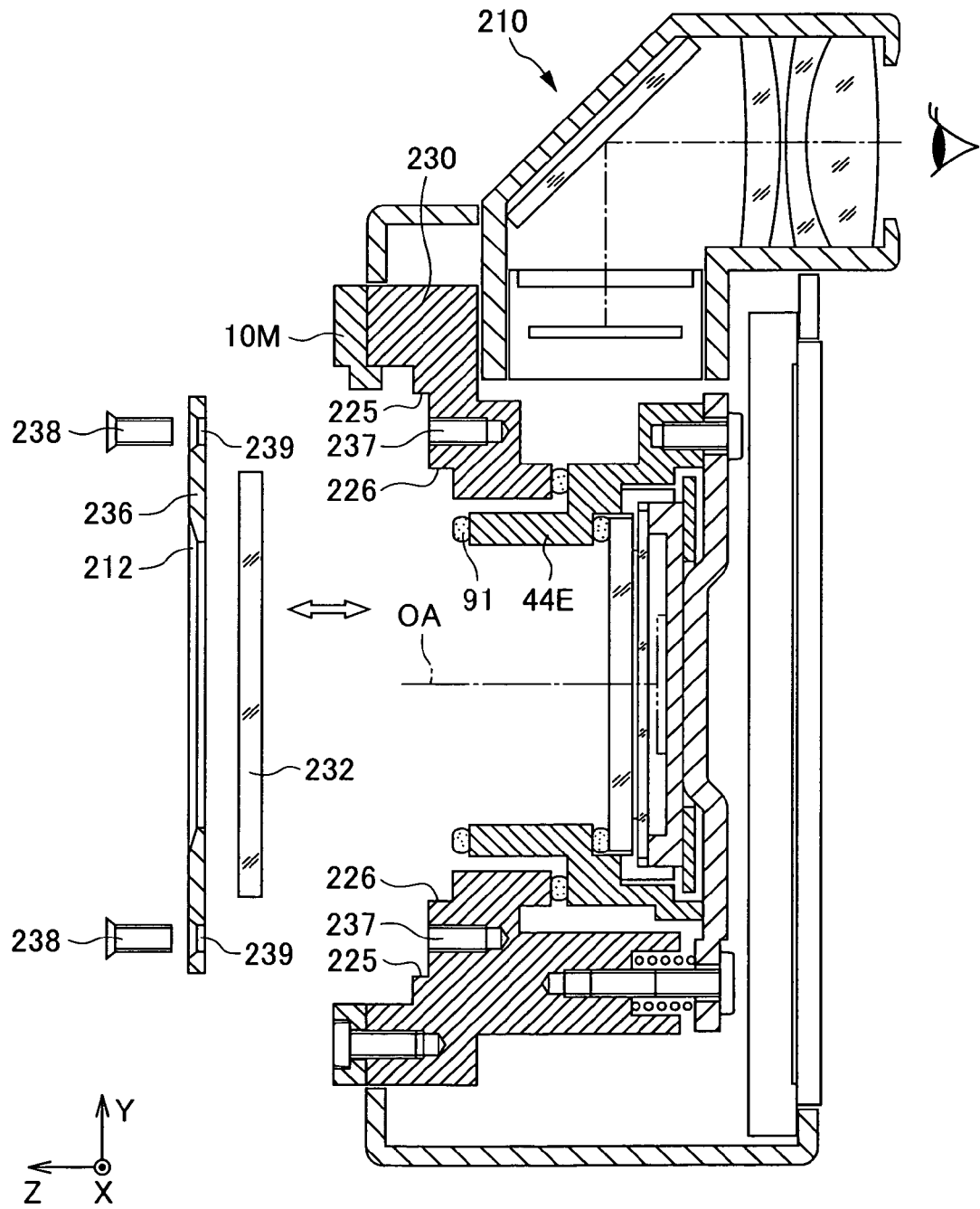
FIG. 7 is a drawing showing the state wherein the cover glass is removed from the camera main body in the third embodiment.
Figure 8:
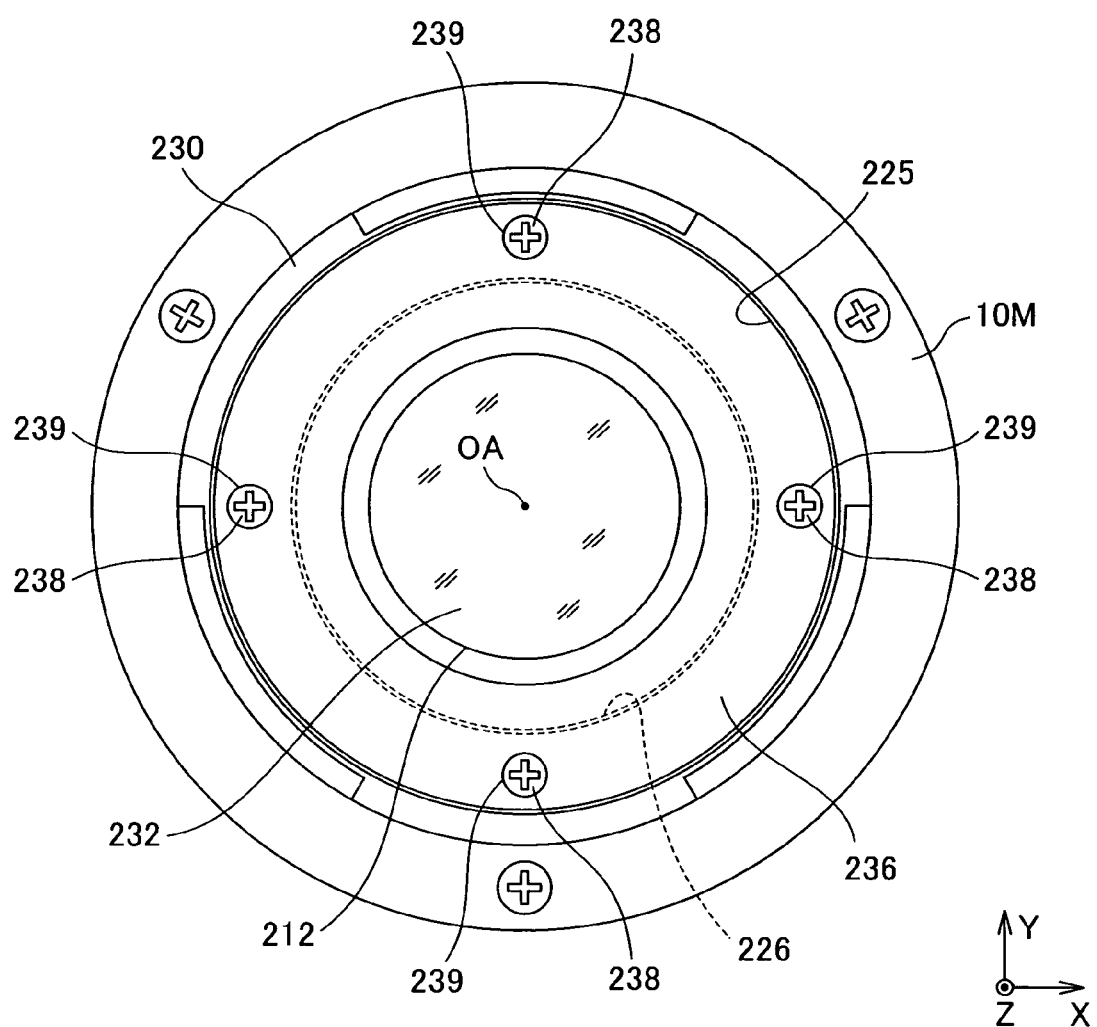
FIG. 8 is a drawing which shows only the inner diameter side of the camera's structure as seen from the AA direction in FIG. 6.

FIG. 6 is a cross sectional drawing showing an outline of the constitution of the camera 200 of the third embodiment, and is a cross section of the state where the freely attachable and removable interchangeable lens 20 is removed from the camera main body 210. FIG. 7 is a drawing showing the state where the cover glass 232 is removed from the camera main body 210. FIG. 8 is a drawing seen from the AA direction of FIG. 6, and shows only the inner diameter side of the camera structural body 230.

The point of difference between the third embodiment and the first embodiment is that the cover glass 232 is attachable and removable with respect to the camera structural body 230. The other parts are the same as for the first embodiment, and similar parts are given the same reference numbers as for the first embodiment, and explanations thereof are omitted.

As shown in the drawings, a first step portion 225 which is a depression at the image pickup device side, is formed further towards the inner diameter side than the pawl portion of the body mount 10 at the front face side of the camera structural body 230. The outer form of the first step portion 225 is formed as a circle with the optical axis OA as its center. In the camera structural body 230, further to the inner side of the first step portion 225, a second step portion 226, recessed and further from the object side than the first step portion 225 and having a smaller diameter than the first step portion 225, is formed.

The cover glass 232 has a somewhat smaller diameter than the diameter of the second step portion 226, and its thickness is about the same as the depth of the second step portion 226, and it can be received in the second step portion 226. Further, the cover glass 232, in the state where it is received in the second step portion 226 as shown in FIG. 6, in the same way as in the first embodiment, is disposed to sandwich first seal member 91 at the end face of the inner face side of the inner casing portion 44E.

A retaining member 236 is disposed at the photographic object side of the cover glass 232. The retaining member 236 is a light shielding member having an annular form, and a transparent hole 212 with a circular shape is provided in its center. The diameter of the image side of the transparent hole 212 is about the same size as the diameter of the inner periphery of the inner casing portion 44E. Further, the transparent hole 212 is formed such that the opening diameter becomes larger towards the photographic object side from approximately the center portion in the thickness direction of the retaining member 236. In this way, the incidence of light towards the photographic object light path of the scattered light (stray light) towards the image pickup device at the inner peripheral face of the transparent hole 212 is prevented.

At the annular portion of the outer periphery side of the transparent hole 212 of the retaining member 236, for example four (the number does not have to be limited to four) screw holes 239 as formed with even spacing with respect to each other on the circumference. Further, in the camera structural body 230, at positions corresponding to these screw holes 239, screw portions 237 with screw cuttings at the inner side are formed.

The fixing screws 238 are screw-joined at the screw portions 237 of the camera structural body 230 which pass through the screw holes 239 of the retaining member 236. By this screw-joining of these fixing screws 238, the retaining member 236 is fixed to the camera main body 230, and the cover glass 232 sandwiched by this retaining member 236 and the camera structural body 230 is also fixed to the camera structural body 230.

FIG. 7 shows the state where the cover glass 232 is removed. As shown in the figure, the cover glass 232 is held only by being sandwiched and held between the retaining member 236 and the camera structural body 230, without using an adhesive, and thus by removing the fixing screws 238, the retaining member 236 and the cover glass 232 can be easily removed.

The camera 200 of the above third embodiment, in addition to the effects of the camera of the first embodiment, has the following effects.
(1) Even after the camera 200 has been assembled and the external parts and electronic package parts and the like have been set to a favorable configuration, it is possible to easily remove the retaining member 236 and the cover glass 232 by removing the fixing screws 238 as described above. Further, by inserting the cover glass 232 into the second step portion 226, and screw joining by inserting the fixing screw 238, held by the retaining member 236, from the screw hole 239 of the retaining member 236 to the screw portion 237 of the camera structural body 230, the cover glass 232 can be easily reinstalled onto the camera structural body 230. Accordingly, in the event that dust is discovered in the airtight space 90 (refer to FIG. 6) in the camera 200 after assembly, the elimination of this dust can be easily carried out. Further, even in the event that dirt or scratches are discovered on the inside of the cover glass 232, it is possible to easily replace only the cover glass 232.

Further, it is possible to reduce the disassembly and reassembly of peripheral parts which do not require cleaning or replacement.

(2) The operation of removing the cover glass 232 is possible only by removing the fixing screws 238, thus this can be carried out by the user himself or herself of the camera 200.

Fourth Embodiment

The fourth embodiment of the present invention is explained below with reference to the figures.

Figure 9:
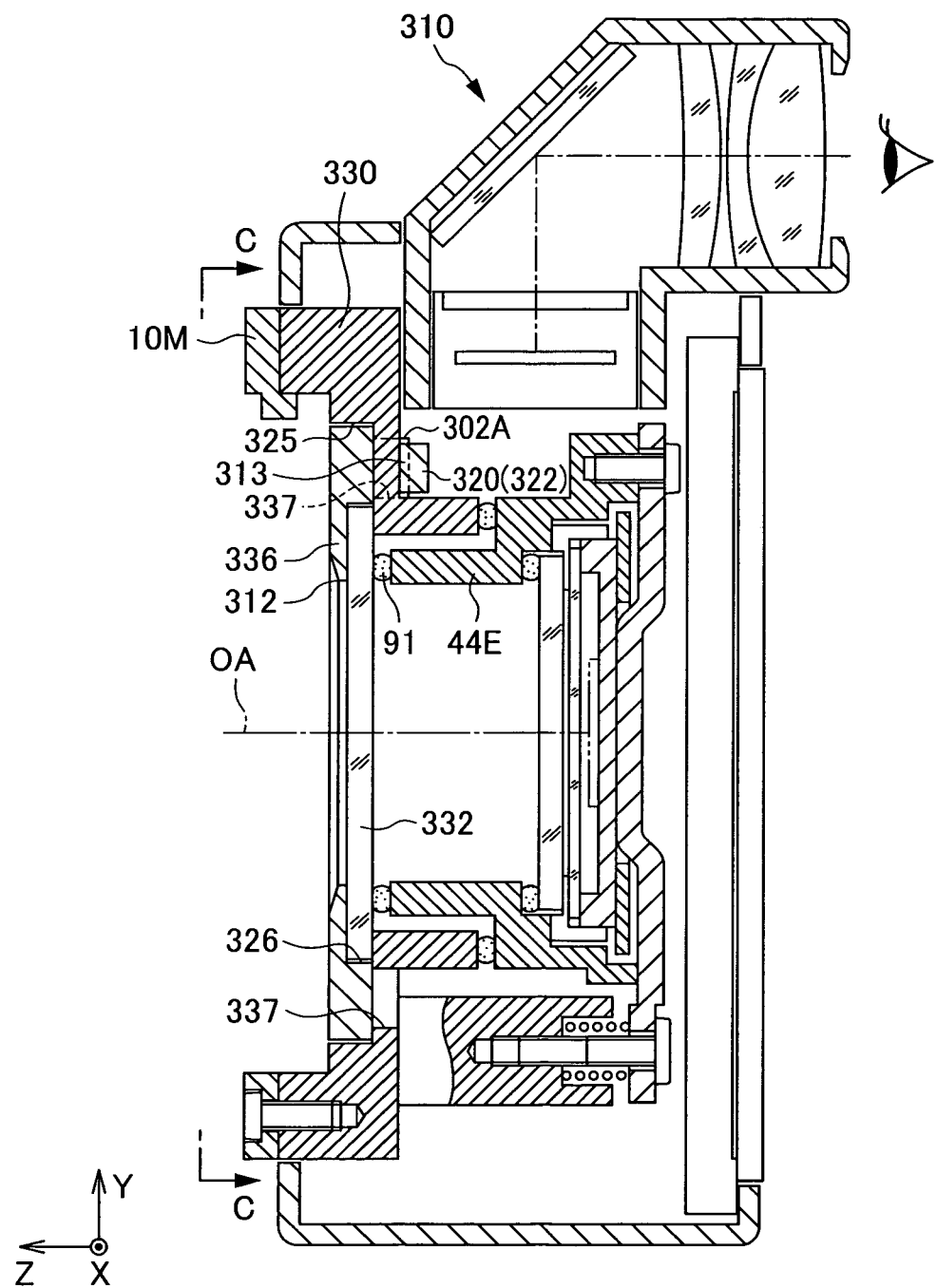
FIG. 9 is a cross sectional drawing showing an outline of the constitution of the camera of the fourth embodiment of the present invention.
Figure 10:
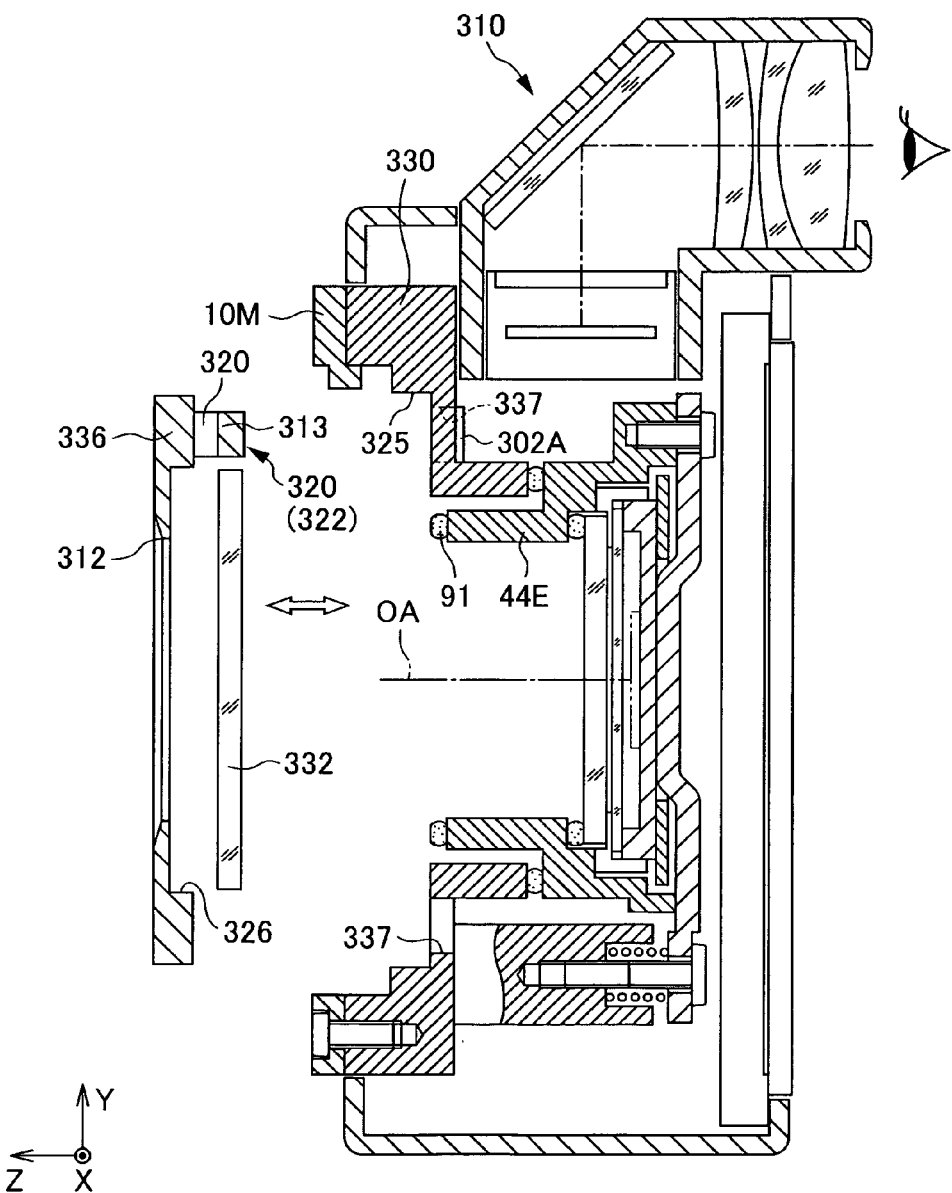
FIG. 10 is a drawing showing the state wherein the cover glass is removed from the camera main body in the fourth embodiment.
Figure 11:
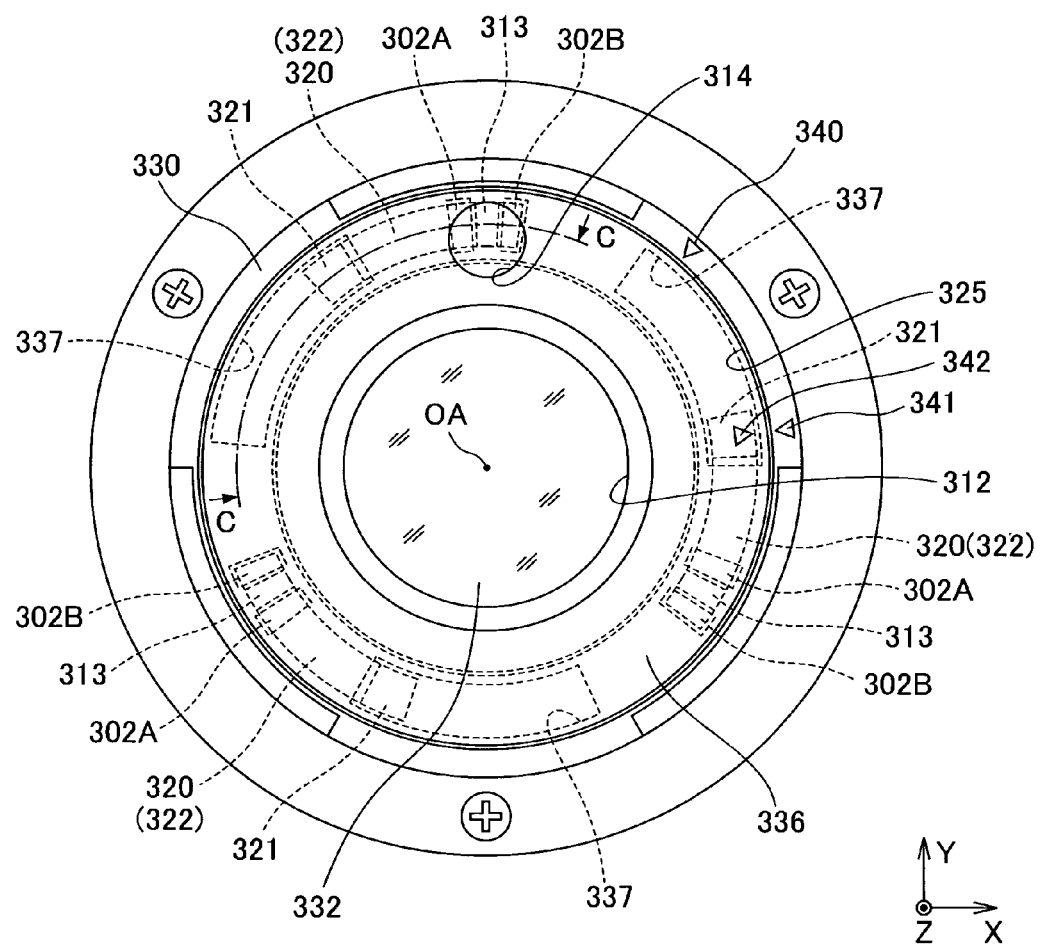
FIG. 11 is a drawing showing the state wherein the retaining member is fixed to the camera structural body, seen from the BB direction in FIG. 10.
Figure 12:
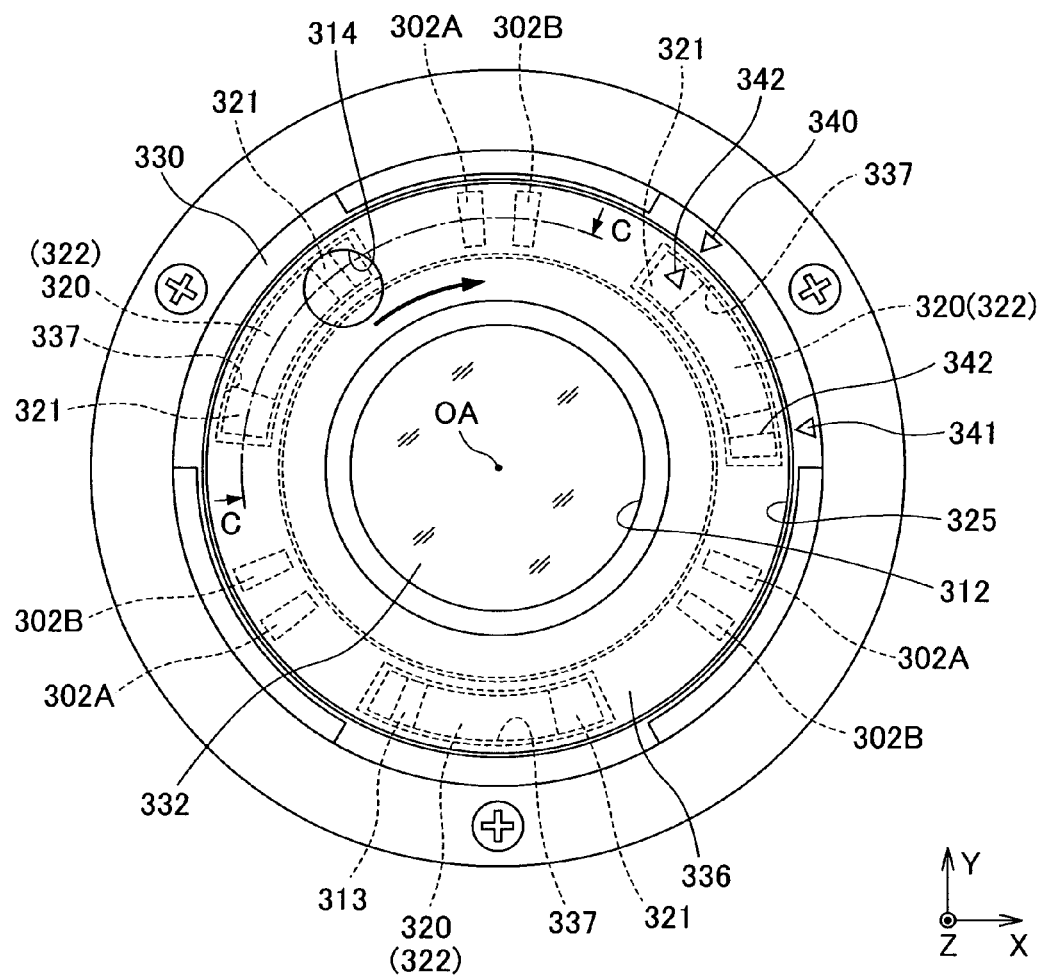
FIG. 12 is a drawing showing the state wherein the retaining member is removed from the camera structural body, seen from the BB direction in FIG. 10.

FIG. 9 is a cross sectional drawing showing an outline of the constitution of the camera 300 of the fourth embodiment, and is a cross sectional drawing of the state wherein the freely attachable and removable interchangeable lens 20 is removed from the camera main body 310. FIG. 10 is a drawing showing the state where the retaining member 336 and the cover glass 332 are removed from the camera main body 310. Further, FIG. 11 and FIG. 12 are drawings seen from the BB direction in FIG. 10, FIG. 11 shows the state where the retaining member 336 is fixed to the camera structural body 330, and FIG. 12 shows the state where the retaining member 336 is removed from the camera structural body 330.

The point of difference between the fourth embodiment and the first embodiment is that the cover glass 332 is attachable and removable with respect to the camera structural body 330. Further, the point of difference between the fourth embodiment and the third embodiment is that the retaining member 336 is attachable to the camera structural body 330 without using the screws members. In other points, it is the same as the first embodiment, and similar parts are given the same reference number as in the first embodiment, and explanations thereof are omitted.

As shown in the drawings, the first step portion 325 which is a depression at the image pickup device side, is formed further towards the inner diameter side than the pawl portion of the body mount 10 at the front face side of the camera structural body 330. The outer form of the first step portion 325 is formed as a circle with the optical axis OA as its center.

At the first step portion 325, a retaining member 336 having a somewhat smaller outer diameter than the diameter of the first step portion 325, and having about the same depth as the greatest thickness of the first step portion 325 is inserted.

The retaining member 336 is formed of a light shielding member, and a transparent hole 312 with a circular shape is provided in its center. Further, the transparent hole 312 is formed such that the opening diameter becomes larger towards the photographic object side from approximately the center portion in the thickness direction of the retaining member 336. In this way, the incidence of light towards the photographic object light path of the scattered light (stray light) towards the image pickup device at the inner peripheral face of the transparent hole 312 is prevented.

At the image pickup device side of the retaining member 336, the second step portion 326 recessed at the photographic object side is formed. The depth of the second step portion 326 is about the same as the thickness of the cover glass 332, and the cover glass 332 can be inserted into the second step portion 326.

Figure 13A:
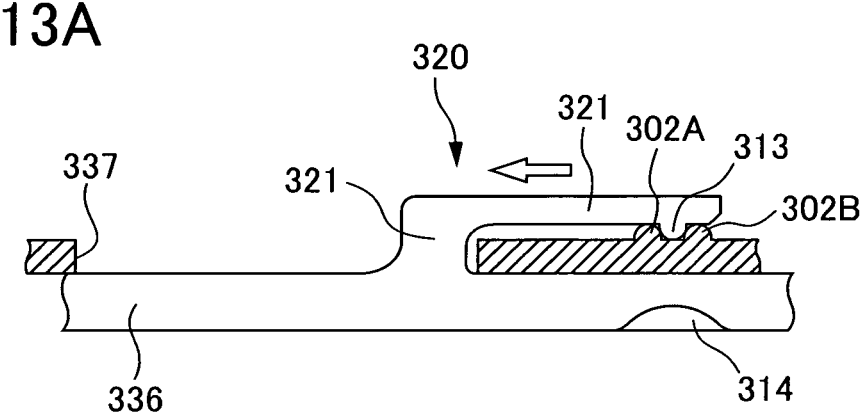
FIG. 13A is a cross sectional drawing along the CC line in FIG. 11.
Figure 13B:
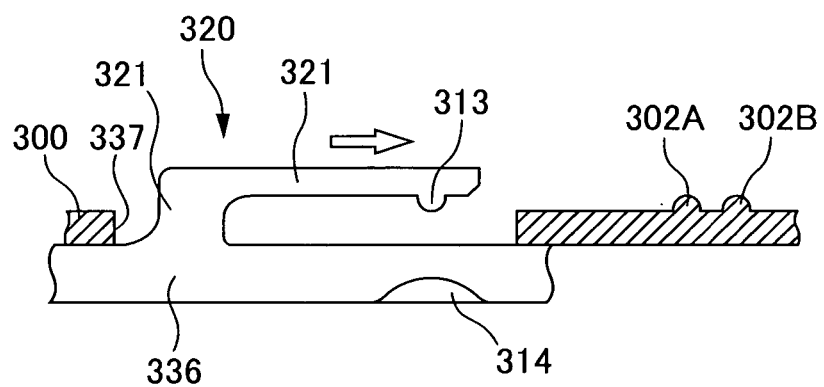
FIG. 13B is a cross sectional drawing along the CC line in FIG. 12.

Further, at the image pickup device side of the retaining member 336, three mounting arm portions 320 are formed at approximately even intervals along the circumference. FIG. 13A is a cross sectional drawing along the CC line in FIG. 11, and FIG. 13B is a cross sectional drawing long the CC line in FIG. 12.

As shown by the figures, the mounting arm portions 320 are provided with the joining portion 321 which joins to the image side face of the retaining member 336, and the extension portion 322 which extends along the circumference parallel to the image side face of the retaining member 336 from this joining portion 321. A retaining member side raised portion 313 is formed protruding towards the inner side (towards the side of the retaining member 336) extending in the width direction of the extension portion 322, at the tip portion of the extension portion 322.

Further, at the photographic object side face (the opposite side face of the mounting arm portion 320) of the portion where the retaining member side raised portion 313 of the retaining member 336 is provided, a circular depression 314 is provided at one location, as shown in FIG. 13.

On the other hand, at the base portion of the first step portion 325, at the camera structural body 330, the insertion openings 337 are provided. The insertion openings 337 are provided at three places with approximately even spacing with respect to each other along the circumference, corresponding to the mounting arm portions 320. The insertion opening 337 is formed to have a length and width such that the mounting arm portion 320 can be inserted.

On the same circumference as the insertion opening 337 of the camera structural body 300, at the object side face of the space between an insertion opening 337 and an insertion opening 337, the two structural body side raised portions 302A and 302B are provided in a line, having approximately the same width (length in the circumferential direction) as the width of the insertion opening 337.

Further, when seen from the photographic object side in FIG. 11 and FIG. 12, the structural body side first index 340 and structural body side second index 341 are provided, shown as triangular marks in the drawings, at portions which are not hidden by the pawl portions of the body mount 10M of the camera structural body 330. On the other hand, the retaining member side index 342 is provided at the photographic object side face of the retaining member 336.

First, the cover glass 332 is inserted into the second step portion 326 of the retaining member 336. Then, as shown in FIG. 12, the retaining member is disposed in the first step portion 325 of the camera structural body 330 such that the structural body side first index 340 and the retaining member side index 342 coincide. The structural body side first index 340 and the retaining member side index 342 show a position such that the arm portion 320 of the retaining member 336 can be inserted into the insertion opening 337 of the camera structural body 330, as shown in FIG. 12 and FIG. 13A.

Then, when a finger presses onto the depression 314 of the retaining member 336 and the retaining member 336 is turned in the direction of the arrows of FIG. 12 and FIG. 13B, the mounting arm portion 320 slides in the circumferential direction (the clockwise direction when seen from the photographic object side) of the body mount 10M.

Then, when the retaining member 336 is turned until the retaining member side index goes from the structural body side first index 340 until the position of the structural body side second index 341, the retaining member side raised portion 313 of the mounting arm portion 320 rides over the first structural body side raised portion 302A which is one of the raised portions provided on the camera structural body 330, and is received in the recessed portion formed by 302A and 302B.

By this rotation, the camera structural body 330 is sandwiched between the main body of the retaining member 336 and the extension portion 322 of the mounting arm portion 320, and the retaining member 336 is fixed to the camera structural body 330. Thus, the cover glass 332 which is sandwiched between the retaining member 336 and the camera structural body 330 is also fixed.

Further, the retaining member side raised portion 313 is held between the first structural body side raised portion 302A and the second structural body side raised portion 302B, and therefore the retaining member 336 is held in this position unless the user inserts a finger into the depression 314 and turns.

Further, when removing the retaining member 336, the opposite of the above operation may be carried out.

The present embodiment as above, in addition to the effects of the first and third embodiments, has the following effects.

(1) The retaining member 336 is attachable and removable from the camera structural body 330 without using screws, and therefore the retaining member 336, namely the cover glass 332, is more easily attached and removed with respect to the camera structural body 330.

(2) When mounting the retaining member 336 with respect to the camera structural body 330, indices are provided, therefore it is easy to determine the position, and further when turning, it is turned from the first index to the position of the second index, and therefore, it can be easily judged whether it is fixed.

Modifications

The present invention is not limited to the above explained embodiments, and as shown below many modifications and variations are possible, and these are also within the scope of the present invention.

(1) In the above embodiments, the entry of dust into the airtight space from the surroundings of the contact parts of the camera structural body and the imaging unit is prevented by a double seal structure of a second seal member interposed between the outer casing portion of the camera structural body and the light shielding structural body (seal step face 44D) of the imaging unit, and a first seal member interposed between the cover glass mounted on the camera structural body and the light shielding structural body of the imaging unit. However, either one alone may be used.

(2) Further, in the above embodiments, the second seal member is interposed between end face of the outer casing portion of the camera structural body and the seal step face of the light shielding structural body of the imaging unit. However, the second seal member may be constituted so as to be interposed between the outer casing portion of the camera structural body and the imaging substrate of the imaging unit, or the image pickup device. Accordingly, the outer casing portion of the camera structural body will extend to a rear face side so as to have a predetermined spacing with the imaging substrate (or the front face glass of the image pickup device), and the second seal member is interposed between the its end face and the imaging substrate (or the front face glass of the image pickup device). According to such a constitution, it is possible to omit the light shielding structural body.

(3) Further, in the above embodiments, the first seal member is interposed between the cover glass 32 mounted on the camera structural body and the inner casing portion of the light shielding structural body of the imaging unit. However, the first seal member may be constituted so as to be interposed between the camera structural body and the inner casing portion.

(4) Further, in the above first and second embodiments, the respective cross sectional forms of the outer casing portion of the camera structural body and the inner casing portion of the light shielding structural body at the imaging unit are formed as square tubes, but they are not limited to square tubes and may be appropriately modified to a cylindrical tube or the like.

Figure 14:
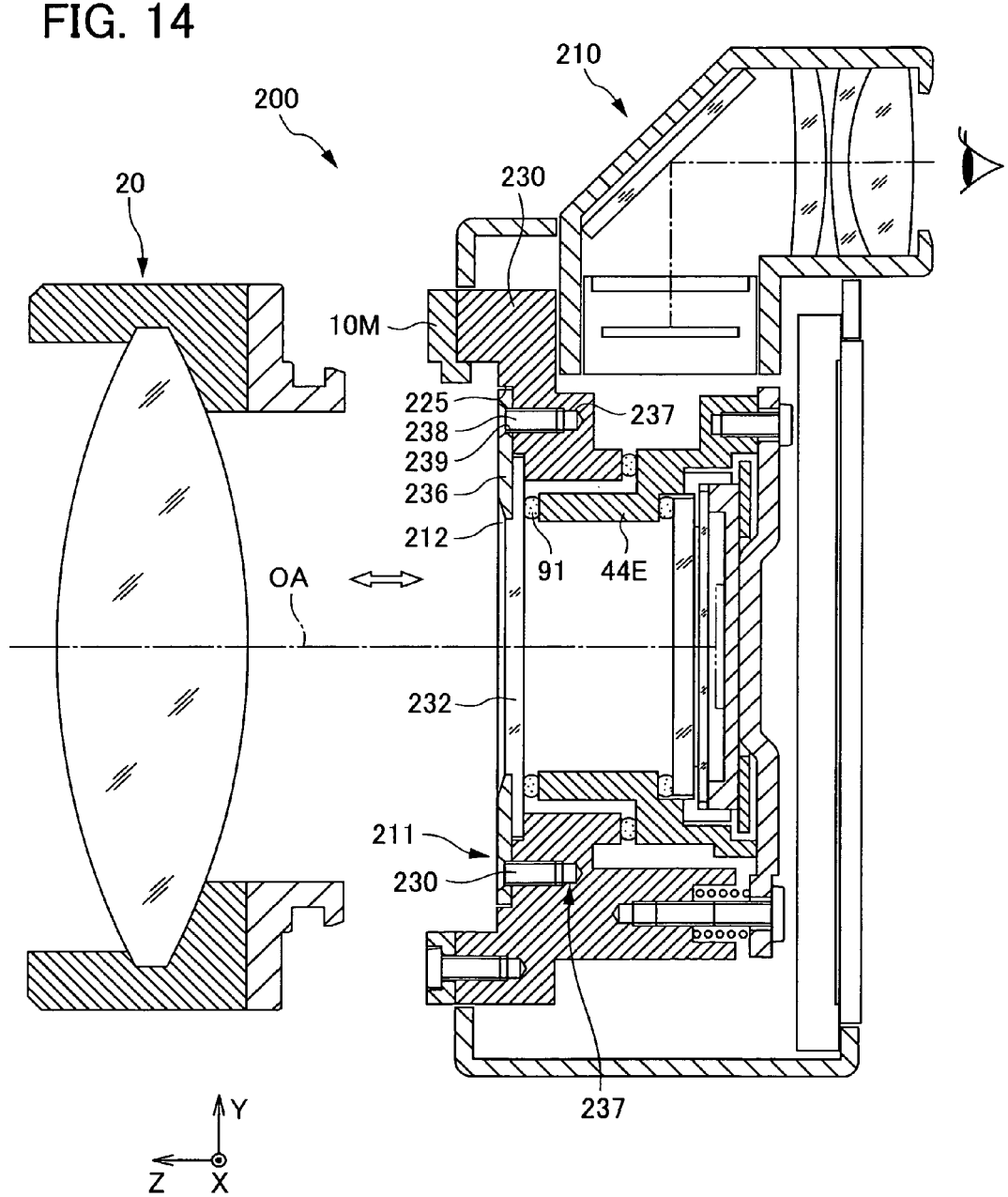
FIG. 14 is a cross sectional drawing showing a modification of the camera of the third embodiment.

(5) In the third embodiment the cover glass is formed as a plate member with a uniform thickness, but the invention is not limited to this. For example, as shown in FIG. 14, the outer peripheral portion of the cover glass may be provided with a step portion and formed thinner, and may be shaped such that the retaining member is inserted into this portion. According to such a form, it is possible to make the cover glass and retaining member thinner overall, while maintaining the thickness which is optically necessary for the cover glass, and thus the camera can be miniaturized.

(6) In the third embodiment, a step portion holding the cover glass is provided at the camera structural body, but without being limited to this, the step portion holding the cover glass may be provided at the retaining member. Further, in the fourth embodiment, the step portion holding the cover glass is provided on the retaining member, but without being limited to this, the step portion holding the cover glass may be provided on the camera structural body.

(7) In the fourth embodiment, an explanation was given for a structure wherein one raised portion (retaining member side raised portion 313) is provided at the mounting arm portion 320 of the retaining member 336, and two raised portions (first structural body side raised portion 302A and second structural body side raised portion 302B) are provided at the imaging side face of the camera structural body 330, and the retaining member side raised portion 313 is sandwiched between and held by the first structural body side raised portion 302A and second structural body side raised portion 302B, but the present invention is not limited to this. For example, it is possible to provide two raised portions at the mounting arm portion 320 of the retaining member 336, and to provide one raised portion at the image side face of the camera structural body 330. Further, for example, one raised portion may be provided at the mounting arm portion 320 of the retaining member 336, and a corresponding recessed portion may be provided at the image side face of the camera structural body 330, or one recessed portion may be provided at the mounting arm portion 320 of the retaining member 336, and a corresponding raised portion may be provided at the image side face of the camera structural body 330.

(8) The retaining member and cover glass disclosed in the third embodiment may have a shape other than circular. In this case, the structure of the body side which contacts them and the outer form of the first step portion 225 and the outer form of the second step portion 226 and the like, are formed so as to match the outer form of the retaining member and the cover glass. Further, in the fourth embodiment, the cover glass may have an outer form other than circular, but at least the retaining member, which is attached and detached by a rotational operation, at least must be circular.

Further, the modifications and variations may be appropriately combined, but detailed explanations thereof are omitted. Further, the present invention is not limited by the above explained embodiments.

What is claimed is:

1. An imaging apparatus, provided with a camera body whereon an interchangeable lens can be removably mounted, said imaging apparatus comprising:
   an imaging portion provided with an image pickup device which images an image of a photographic subject,
   a first housing which holds the imaging portion, a protective cover which is disposed more towards a photographic object side than the first housing,
   a second housing which is a housing independent of the first housing, which holds the protective cover and which is provided with a mount structure more towards the photographic object side than the protective cover, to attachably and removably mount interchangeable lenses at the photographic object side, and
   a plurality of sealing members comprising a first sealing member provided between and in contact with the first housing and the imaging portion, and a second sealing member provided between and in contact with the first housing and the second housing or the protective cover; wherein
   the camera body is constituted by the first housing and the second housing, and
   an airtight space is formed by the first housing, the imaging portion, the plurality of sealing members, and at least one of the second housing and the protective cover.

2. The imaging apparatus according to claim 1, further comprising at least one of
   a first tubular portion provided at the first housing and extending along an optical axis perpendicular to an image face of the image pickup device, or
   a second tubular portion provided at the second housing and extending along the optical axis.

3. The imaging apparatus according to claim 2, which
   in the case that the first housing has the first tubular portion, the plurality of sealing members further comprises a third sealing member between the first tubular portion and the protective cover or the second housing, and
   in the case that the second housing has the second tubular portion, the plurality of sealing members further comprises a fourth sealing member between the second tubular portion and the imaging portion or the first housing.

4. The imaging apparatus according to claim 2, wherein
   in the case that the first housing has the first tubular portion, and the second housing has the second tubular portion, the first tubular portion is disposed on the inner side of the second tubular portion.

5. The imaging apparatus according to claim 1, further comprising
   a third sealing member interposed between the imaging portion and the first housing.

6. The imaging apparatus according to claim 1, wherein the imaging portion is position adjustable in a direction perpendicular to the image face of the image pickup device.

7. The imaging apparatus according to claim 1, wherein
   the imaging portion is position adjustable in a direction parallel to the image face of the image pickup device, with respect to the second housing.

8. The imaging apparatus according to claim 1, wherein
   the second housing is provided with a barrier member which can open and close a passing area of photographic object light incident on the imaging portion, at a position further towards the photographic object side than the protective cover.

9. The imaging apparatus according to claim 1, wherein
   the protective cover, in a state where the imaging apparatus has been assembled, is attachable and removable with respect to the second housing.

10. The imaging apparatus according to claim 9, further comprising
    a retaining member disposed at the photographic object side of the protective cover, which has an attachable and removable structure with respect to the second housing, and which sandwiches and holds the protective cover between the retaining member and the second housing.

11. The imaging apparatus according to claim 10, wherein
    the attachable and removable structure comprises
    an arm portion, provided at an outer peripheral portion of an image side of the retaining member, with one end joined to a joining portion of the retaining member, and extending parallel to the retaining member along a circumference from the joining portion, and
    an insertion opening, provided at the second housing, through which the arm portion is insertable,
    and is constituted such that
    in a state where the protective cover is disposed between the second housing and the retaining member, the arm portion is inserted into the insertion opening, and when the retaining member is rotated in a direction from the one end side of the arm portion towards the other end side, the other end side of the arm portion inserted into the insertion opening enters into an image side rear face of the second housing, and the retaining member is fixed to the second housing.

12. The imaging apparatus according to claim 11, wherein
    an engagement portion is provided at an end portion of a photographic object side face of the arm portion, and
    an engagement receiving portion with which the engagement portion becomes engaged when the retaining member is rotated with respect to the second housing, is provided at an image side face of the second housing.

13. An imaging apparatus, provided with a mount structure whereon an interchangeable lens can be removably mounted, said imaging apparatus comprising:
    a camera body comprising a first housing and a second housing which is independent of the first housing;
    an imaging portion provided with an image pickup device which images an image of a photographic subject, and which is held by the first housing;
    a protective cover which is disposed more towards a photographic object side than the first housing, and which is held by the second housing, and
    a plurality of sealing members comprising a first sealing member provided between and in contact with the first housing and the imaging portion, and a second sealing member provided between and in contact with the first housing and the second housing or the protective cover, wherein
    the second housing holds the mount structure more towards the photographic object side than the first housing and the protective cover, and
    an airtight space is formed by the first housing, the imaging portion, the plurality of sealing members, and at least one of the second housing and the protective cover.

14. An imaging apparatus, provided with a mount structure whereon an interchangeable lens can be removably mounted, said imaging apparatus comprising:
    a camera body comprising a first housing and a second housing which is independent of the first housing;
    an imaging portion provided with an image pickup device which images an image of a photographic subject, and which is held by the first housing;

a protective cover which is disposed more towards a photographic object side than the first housing, and which is held by the second housing; and a plurality of sealing members comprising a first sealing member provided between and in contact with the first housing and the imaging portion, and a second sealing member provided between and in contact with the first housing and the second housing or the protective cover, wherein the second housing holds the mount structure more towards the photographic object side than the first housing and the protective cover.

15. An imaging apparatus, provided with a camera body whereon an interchangeable lens can be removably mounted, said imaging apparatus comprising:

an imaging portion provided with an image pickup device which images an image of a photographic subject, a first housing which holds the imaging portion, a protective cover which is disposed more towards a photographic object side than the first housing, a second housing which is a housing independent of the first housing, which holds the protective cover and which is provided with a mount structure more towards the photographic object side than the protective cover, to attachably and removably mount interchangeable lenses at the photographic object side, and at least one of a first tubular portion provided at the first housing and extending along an optical axis perpendicular to an image face of the pickup device, or a second tubular portion provided at the second housing and extending along the optical axis, wherein in the case that the first housing has the first tubular potion, and the second housing has the second tubular portion, the first tubular portion is disposed on the inner side of the second tubular portion;

the camera body is constituted by the first housing and the second housing, and an airtight space is formed by at least one of the second housing and the protective cover, the first housing, and the imaging portion.

* * * * *

UNITED STATES PATENT AND TRADEMARK OFFICE
CERTIFICATE OF CORRECTION

PATENT NO. : 8,582,020 B2
APPLICATION NO. : 12/656278
DATED : November 12, 2013
INVENTOR(S) : Hideaki Hoshikawa It is certified that error appears in the above-identified patent and that said Letters Patent is hereby corrected as shown below:

In the Claims

In Column 20, Line 12, In Claim 15, delete "potion," and insert -- portion, --, therefor.

Signed and Sealed this
Twenty-fifth Day of March, 2014

Michelle K. Lee
*Deputy Director of the United States Patent and Trademark Office*